United States Patent [19]

Hara et al.

[11] Patent Number: 4,983,701

[45] Date of Patent: Jan. 8, 1991

[54] SILICONE COMPOSITION FOR RENDERING SURFACES NON-ADHERENT

[75] Inventors: Yasuaki Hara; Masahiko Ogawa; Meguru Kashida, all of Annaka, Japan

[73] Assignee: Shin-Etsu Chemical Co., Ltd, Tokyo, Japan

[21] Appl. No.: 303,179

[22] Filed: Jan. 30, 1989

[30] Foreign Application Priority Data

Feb. 26, 1988 [JP] Japan .................................. 63-45448

[51] Int. Cl.$^5$ .............................................. C08G 77/06
[52] U.S. Cl. ......................................... 528/15; 528/31; 528/32
[58] Field of Search .............................. 528/31, 15, 32

[56] References Cited

U.S. PATENT DOCUMENTS 4,130,707 12/1978 Leiser et al. ......................... 528/31
4,426,240 1/1984 Louis et al. .......................... 528/15

Primary Examiner—Melvyn I. Marquis
Assistant Examiner—Karen A. Hellender
Attorney, Agent, or Firm—Millen, White & Zelano

[57] ABSTRACT

A releasing agent silicone composition which gives an improved cured film for rendering surfaces non-adherent having lasting releaseability, good slip factor, and stable peeling strength and rate of residual adhesive strength, even when the adhesive material is acrylic, employs a first organopolysiloxane having at least two silicon-bonded unsaturated groups, a second organopolysiloxane having at least two silicon-bonded hydrogen atoms, and a third organopolysiloxane having one end terminated by a Si—H bond.

16 Claims, No Drawings

SILICONE COMPOSITION FOR RENDERING SURFACES NON-ADHERENT

BACKGROUND OF THE INVENTION

The present invention relates to silicone compositions for rendering surfaces non-adherent, more particularly to silicone compositions which are curable to form a durable layer on surfaces that renders the surfaces non-adherent, slippery, and easy to release adhesive materials therefrom which are applied thereto.

Conventionally, in order to give release characteristics (the capacity of permitting an adhesive material sticking to a surface to peel off easily) to the surfaces of films and sheets made from cellulose, synthetic resin, and synthetic fiber, the surfaces are coated with a silicone composition which cures to form a film having releaseability. For this purpose, so-called addition reaction-type silicone compositions are commonly used, whose main components are vinyl group-containing organopolysiloxanes and organohydrogenpolysiloxanes having silicon-bonded hydrogens.

The application and curing of such silicone compositions on the surface of a base material in the form of a film or sheet is conducted at temperatures from 100° C. to 200° C. for no longer than 5 to 60 seconds because the base material is usually as thin as 100 μm or even thinner, and is scarcely heat resistive, and also for reasons of economics. However, the known silicone release agents used for rendering surfaces non-adherent are more or less unpredictable in their ability to form a cured film on such surfaces, especially with respect to durability, which is so poor that the releaseability of the film does not persist. In other words, the peel resistance (hereinafter referred to as "peeling strength") tends to become abnormally high, as time goes by. This tendency is the most profound when the adhesive material is acrylic solvent-type.

Another problem arises when the application and curing process is conducted at a relatively low temperature and at a rate that barely allows completion of curing of the silicone composition before the sheet is rolled, i.e., the barely cured film on the sheet tends to stick to itself as well as to the back surface of the sheet as the sheet is rolled into a roll, whereby smooth rolling operation is blocked (hereinafter called "blocking"). Also, when a cured film with a static charge is exposed to the atmosphere for a relatively long period, the charged film adsorbs dust from the air and the resulting dusty film tends to lose much of its ability to release an adhesive material that is applied to it. Conventional silicone release agents are also apt to form a cured film which has poor slip factor and therefore are not suitable for labels for music tape cassettes, which require good slip factor.

When the manufacturing line for applying silicone composition to the base sheet or film is arranged such that the cured film of the silicone composition comes in contact with receiving spools or guide rollers, a cured film with poor slip factor tends to cause the flow of the sheet or film to stagnate at the spools and rollers, which also results in contamination of the spools and rollers.

In order to solve these problems, a method was proposed, according to which, the amount of the platinum-containing catalyst contained in the addition reaction-type silicone composition is increased thereby rendering it possible to shorten the heating time required for curing the coating film. However, the silicone compositions formulated in this manner have reduced pot life, the cured film obtained from this composition is chemically so unstable that it readily undergoes degradation when exposed to air, and its slip factor is yet far from desirable. Moreover, the increased amount of expensive platinum-containing catalyst leads to poor economy.

It has also been examined whether admixing the compositions with a dimethylsiloxane oil or gum, a silicone oil modified by polyether, a surface active agent, wax, etc. would bring about positive results. Unfortunately, the results were more or less negative, i.e., the resulting silicone compositions proved to be less curable and the part of the composition which fails to cure sufficiently on the base sheets blooms (emerges from the cured surface) so that when a pressure sensitive adhesive material is pressed on the cured film surface, the insufficiently cured composition adversely affects the residual adhesive strength of the adhesive material, i.e., the strength of the adhesion of an adhesive material measured after it is peeled off a surface to which it has been pasted.

OBJECTS OF THE INVENTION

It is an object of the invention to provide silicone compositions for rendering surfaces non-adherent which compositions are capable of forming a well-cured coating film that possesses good releaseability, slip factor, durability in the air, and chemical stability which maintains good peeling strength (resistance) for a long period of time.

The foregoing and other objects, features and advantages of the present invention will be apparent from the following detailed description thereof.

SUMMARY OF THE INVENTION

The foregoing and other objectives are attained by rendering surfaces non-adherent with curable silicone compositions which comprise a first organopolysiloxane which contains at least two silicon-bonded unsaturated groups, a second organopolysiloxane containing a plurality of silicon-bonded hydrogen atoms, and an organopolysiloxane having a single Si—H bond, which is at one end of its molecule.

In one embodiment, this invention relates to curable silicone compositions according to claim 1. In another embodiment, this invention relates to substrates, such as sheets, films and foil having at least one surface thereof rendered releaseable with respect to adhesive materials applied thereto by a cured layer thereon of a releasing agent according to claim 1.

DETAILED DESCRIPTION OF THE INVENTION

In a preferred embodiment, the organopolysiloxane with a terminal Si—H bond is represented by formula (I):

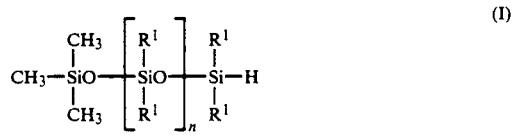

wherein $R^1$ is a monovalent organic group which is free from aliphatic unsaturated bond therein and one $R^1$; may be different from or the same as another $R^1$; and n is an integer from 1 to 100.

A preferred releasing agent silicone composition of the present invention comprises:

(A) 100 weight parts of a first organopolysiloxane having at least two silicon-bonded unsaturated groups per molecule;

(B) 0.1 to 10 weight parts per 100 weight parts of component (A) of a second organopolysiloxane having at least two silicon-bonded hydrogen atoms per molecule;

(C) 0.1 to 50 weight parts per 100 weight parts of component (A) of a third organopolysiloxane having a terminative Si—H bond represented by the general formula (I); and (D) a catalytically effective amount of a platinum-containing catalyst.

The unsaturated group-containing organopolysiloxane employed as component (A) possesses at least two silicon-bonded unsaturated group per molecule, which preferably are bonded to different silicon atoms. Examples of such organopolysiloxanes include those whose skeletal chain comprises at least one unit of a segment represented by formula (II):

wherein $R^5$ is an unsaturated group such as vinyl, an aliphatic unsaturated hydrocarbon such as allyl, an alicyclic unsaturated group such as the one represented by formula (III);

or an unsaturated group represented by $CH_2=CHCOOR^7$— (in which $R^7$ is a divalent organic group such as methylene, ethylene, propylene, and phenylene).

The $R^6$ group is a hydrocarbon group of 1 to 8 carbon atoms, which atoms may or may not have a substituent bonded thereto. Examples of $R^6$ groups include alkyl groups, e.g., methyl, ethyl, propyl, and butyl; aryl groups, e.g., phenyl and tolyl; cycloalkyl groups, e.g., cyclohexyl; and any of these groups wherein some or all of the carbon-bonded hydrogen atoms are substituted by a substituent such as a halogen and cyano, and an example of halogen-substituted group is 3,3,3-trifluoropropyl group and an example of cyano-substituted group is cyanomethyl group. The subscripts a and b are integers such that $1 \leq a \leq 3$, $0 \leq b \leq 2$, and $1 \leq a+b \leq 3$. The possible segments in the skeleton of the organosiloxane as component (A) other than the ones represented by formula (II) include hydrocarbon groups having 1 to 8 carbon atoms, the groups either having or not having substituent(s) bonded thereto. Other examples of possible hydrocarbon groups include those mentioned by way of example for $R^6$.

It is preferred that the component (A) organopolysiloxanes are such that more than 90% of the organic groups in each molecule are methyl.

The component (A) organopolysiloxanes of the invention can be linear, branched or cyclic but the most preferably linear.

The most preferred component (A) organopolysiloxane has a linear chain having a vinylsilyl terminal wherein more than 90% of the organic group-substituents are methyl. The vinylsilyl terminal group may contain more than one vinyl group.

The component (A) organopolysiloxane may be a copolymer of the type obtained by the polymerization of organopolysiloxanes containing ≡Si—Si≡ and/or ≡Si—$R^2$—Si≡ groups wherein $R^2$ is, e.g., a divalent organic group such as methylene, ethylene, propylene, phenylene and polyoxyethylene.

The viscosity of the component (A) organopolysiloxane, measured at 25° C., is preferably higher than 100 cP, and may be as high as several million cP to tens of million cP (at which viscosity levels the organopolysiloxane is gummy).

The organopolysiloxane employed as component (B) contains at least two hydrogen atoms bonded to silicon atoms, preferably to different silicon atoms. Examples of such organopolysiloxane include those represented by general formula (IV):

wherein $R^9$ is a hydrocarbon group which may have one or more substituent attached thereto. Examples of $R^9$ include those hydrocarbon groups mentioned above as examples of $R^6$, preferably more than 50% of the $R^9$ groups are methyl. The subscripts c and d are numbers such that $0 < c < 3$, $0 < d < 3$, and $0 < c+d \leq 3$, preferably $1 \leq c \leq 2$, $0 < d \leq 1$, and $1.98 \leq c+d \leq 2.02$.

The component (B) organopolysiloxane when represented by formula (IV) may be a linear, cyclic, or branched polymer, a block-copolymer or a graft-copolymer, and preferably is a linear polymer. The component (B) organopolysiloxane may be a liquid having low molecular weight, such as a silane compound, or may be a siloxane containing a ≡Si—O—Si≡ group or a ≡Si—Si≡ group.

For the purpose of achieving compatibility with component (A), the viscosity of the component (B) organopolysiloxane is preferably 10 to 300 cP (at 25° C.) and lower than that of component (A) employed.

The content of component (B) in the composition of the invention is minor compared to component (A), e.g., 0.1 to 10 weight parts, preferably 0.2 to 8 weight parts, per 100 weight parts of component (A). If the content of component (B) is smaller than 0.1 weight part per 100 weight parts of component (A) or it exceeds 10 weight parts, the resulting composition tends to form a film which cures poorly and hence has poor releaseability. It is preferred that the amount of component (B) is such that the resulting mole ratio of the silicon-bonded hydrogen atoms in component (B) to the silicon-bonded unsaturated groups in component (A) is 0.5 to 5.0, or more preferably 1.0 to 3.0.

The component (c) organopolysiloxane with a Si—H terminal bond at one end is preferably a polymer represented by formula (I) in which $R^1$ is a monovalent organic group having no active hydrogen atom or aliphatic unsaturated bond therein, for example, an alkyl group, e.g., methyl, ethyl, propyl, and butyl; an aryl group, e.g., phenyl and tolyl; a cycloalkyl group, e.g., cyclohexyl, or any of these groups wherein some or all of the carbon-bonded hydrogen atoms are replaced by a substituent, e.g., halogen and cyano. Most preferably, most or all of the $R^1$ groups are methyl. The subscript n is an integer from 1 to 100, preferably 5 to 80. If n exceeds 100, the component (C) loses much of its reactivity to the unsaturated groups of component (A), and the unreacted portion of component (C) tends to bloom, i.e., emerge from the surface of the cured coating film, which, although contributive to improving slip factor and thus reducing the frequency of blocking, reduces the residual adhesive strength of any adhesive material pasted onto the releaseable surface as a result of the unreacted component (C) transfering to the adhesive material.

The content of component (C) in the compositions of this invention should ordinarily be 0.1 to 50 weight parts, preferably 1 to 20 weight parts, per 100 weight parts of component (A). If the content of component (C) is smaller than 0.1 part, component (C) does not have a significant effect on the properties of the resulting composition, and if its dosage is over 50 weight parts, the curability of the resulting composition becomes extremely poor and consequently the residual adhesive strength of any adhesive material which is pasted onto the poorly cured coated film becomes very low.

From the viewpoint of the desirableness of properly cured, and hence highly releaseable, coating film, it is preferred that the mole ratio of the total silicon-bonded hydrogen atoms in components (B) and (C) to the total silicon-bonded unsaturated groups in component (A) is 0.5 to 5.0, more preferably 1.0 to 3.0.

The curable compositions of this invention ordinarily contain an amount of a curing catalyst effective to achieve an acceptable curing rate, e.g., from a few seconds to a few minutes at an elevated temperature.

A platinum-containing catalyst, which is component (D) of the composition of the invention, may be any of the conventional ones that are used in addition reactions. Examples include platinum black or platinum supported on silica, carbon black or the like; chloroplatinic acid; alcohol solution of chloroplatinic acid; complex salts resulting from the reactions of chloroplatinic acid with olefin, vinyl siloxane, etc.

The content of component (D) usually is 0.0001 to 0.1 weight part, preferably 0.0002 to 0.05 part, per 100 weight parts of component (A).

The compositions of this invention can be produced by mixing the three organopolysiloxanes as defined herein, preferably by mixing components (A), (B), (C), and (D) in the selected ratio. There is no prescribed method for mixing these components but usually it is preferable if components (A), (B), and (C) are mixed uniformly and then component (D) is thereafter added to the mixture.

For the purpose of restraining the catalytic activity of component (D), it is recommended, when necessary, to add to the compositions of this invention a conventional deactivator such as an organic nitrogen compound, an organic phosphorous compound, a hydrocarbon of acetylene series, an oxime, or an organic chloro-compound.

With a view to modifying the characteristics of the cured film, for example, reducing the peeling strength of the cured film which is obtained by curing a composition of the invention on a base material or substrate, it is effective to admix the composition with dimethylpolysiloxane.

A composition of the invention can be applied to a base material as it is obtained by mixing the three organopolysiloxanes, or one may first dilute the composition with a suitable non-reactive organic solvent, such as toluene, xylene, hexane, and methylethylketone.

Depending on the specific requirements arising from the nature of use, the composition of the invention may optionally contain one or more kind of dyestuff, a pigment, an antistatic additive, a reinforcing filler, an adhesion increasing agent, a thickener, and/or a conventional additive that improves one or other of the characteristics of the composition.

Suitable base materials to which the curable compositions of the invention are applied to at least one surface thereof and cured to form a cured non-adhesive coating layer thereon include films, foils, and sheets of cellulose, synthetic resin, or synthetic fiber, for example, glassine paper, kraft paper, clay coated paper, polyethylene laminate paper, polyethylene film, polypropylene film, vinyl chloride film, polyester film, and aluminum foil, as well as three dimensional objects formed from such materials.

The optimum viscosity of the composition of the invention depends on the thickness of the application, the application method, and the kind of the base material. From the viewpoint of work efficiency and controllability of application amount, it is recommended that the viscosity be lower than about 1000 cP when the composition is not diluted with an organic solvent, and that the viscosity be lower than 100 cP after dilution when the composition is diluted with an organic solvent. If the composition of the invention does not adhere well on the base material to which it is applied, it is suggested to try the following be employed singly or in combination: apply a primer to the surface of the base material; coarsen the surface of the base material; and treat the surface of the base material with plasma.

The invention is described in more detailed manner by way of the following examples, in which the term "parts" means "parts by weight" and the viscosity values are obtained by the measurement at 25° C.

EXAMPLE 1

Employing the ratio as prescribed in Table 1, a gummy dimethylvinylpolysiloxane having a dimethylvinylsilyl terminal group at each end of the molecule, containing 0.5 mole % of vinyl groups, and having a viscosity of 6 million cP was dissolved in toluene, and to this mixture were added: (i) a methylhydrogenpolysiloxane having a trimethylsilyl terminal group at each end of the molecule, containing 95 mole % of a unit represented by formula (V), and having a viscosity of 20 cP, (ii) a methylhydrogenpolysiloxane of general formula (VI) having a Si—H bond at one end, and (iii) 3-methyl-1-butyne-3-ol. After mixing evenly the mixture was blended with a complex salt prepared from platinum and vinylsiloxane, whereby the composition of Example 1 was obtained.

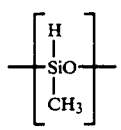
(V)

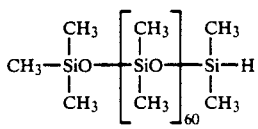
(VI)

Thereafter, the obtained composition was tested in the tests described below for curability, peeling strength of the cured film, and residual strength of adhesive material.

PREPARATION OF SPECIMENS

Ten minutes after addition of the catalyst, the resultant composition was applied as a thin layer to one face of a sheet of to glassine paper having a paper density of 80 g/m$^2$ (manufactured by Tomoegawa Paper Co., Ltd.) at a rate of 1.0 g/m$^2$, and cured by heating at 180° C. for 5 seconds in a hot air circulation-type drying furnace, whereby the specimen for measurement of curability was obtained.

The specimens of the other examples described below for measurements of peeling strength, slip factor, and residual adhesiveness were obtained in the same manner, employing the respective compositions of those examples.

The curability, slip factor, rate of residual adhesiveness, peeling strength and durability in the air of the cured composition of Example 1 and the other examples which follow were determined according to the following tests, the results of which are given in Table 1.

MEASUREMENT OF CURABILITY

The surface of the cured composition was lightly rubbed with a finger, and the result was estimated by the following standards:

A: The surface was not smeared and did not rub off.
B: The surface was smeared a little and slightly rubbed off.
C: The surface was substantially smeared and rubbed off.

SLIP FACTOR

A piece of styrene-butadiene rubber weighing 200 g was placed on the cured film surface of the Specimen and the rubber was pulled in a direction parallel to the cured film surface at a rate of 300 mm per minute. The coefficient of dynamic friction of the surface was obtained by dividing the minimum force required to keep the rubber piece moving by the weight of the rubber piece (200 g).

PEELING STRENGTH

The cured film surface of the Specimen was coated with acrylic solvent-type adhesive (Oribain BPS-5127 manufactured by Toyo Ink Manufacturing Co., Ltd.) and heated at 100° C. for three minutes. The thus-treated adhesive surface was then covered closely with a sheet of paper having a paper density of 40 g/m$^2$ and aged at a temperature of 25° C. and under a pressure of 20 g/cm$^2$ for one day, three days, seven days, and 30 days, respectively. At the end of each of these periods, the laminate was cut in strips, each having a width of 5 cm. The sheet of paper was then peeled using a tensile testing machine at a pulling velocity of 300 mm/min. The force required to peel the paper was measured in grams.

RATE OF RESIDUAL ADHESIVENESS

The cured film surface of the Specimen was coated with an adhesive polyester tape called Lumirror 31B (manufactured by Nitto Electric Industrial Co., Ltd.) and aged at a temperature of 70° C. and under a pressure of 20 g/cm$^2$ (caused by a weight placed on the lamination) for 20 hours, at the end of which time the polyester tape was peeled off and pasted onto a stainless steel plate. The polyester tape was then peeled at a pulling angel of 180° and at a pulling velocity of 300 mm per minute. The force ($F_1$) required to peel the cured film was measured. A fresh length of the same adhesive polyester tape was also pasted onto the same stainless steel plate. The force ($F_2$) required to peel the polyester tape from the steel was measured. The rate of residual adhesiveness was defined herein as the value calculated through the following equation:

$$\text{(rate of residual adhesiveness in \%)} = \frac{F_1}{F_2} \times 100.$$

DURABILITY IN THE AIR

The cured film surface was exposed to the air for three hours. Thereafter, the Specimen was subjected to the same procedure for measurement of peeling strength described above, except that the aging time was three days only.

COMPARATIVE EXAMPLE 1

A composition was prepared in exactly the same manner as the preparation of Example 1 except that the methylhydrogenpolysiloxane having a Si—H terminal bond at one end (VI) was omitted. The resulting composition was measured in terms of curability, peeling strength of the cured film, and the rate of residual adhesiveness. The results are shown in Table 1.

COMPARATIVE EXAMPLE 2

A composition was prepared in exactly the same manner as the preparation of Example 1 except that the methylhydrogenpolysiloxane having a Si—H terminal bond at one end was replaced by 10.0 weight parts of a siloxane represented by formula (VII). The resulting composition was measured in terms of curability, peeling strength of the cured film, and the rate of residual adhesiveness. The results are shown in Table 1.

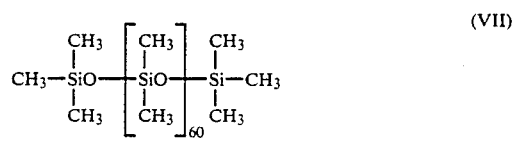
(VII)

COMPARATIVE EXAMPLE 3

A composition was prepared in exactly the same manner as the preparation of Example 1 except that the methylhydrogenpolysiloxane having a Si—H terminal bond at one end was replaced by 10.0 weight parts of a siloxane represented by formula (VII). The resulting composition was measured in terms of curability, peeling strength of the cured film, and the rate of residual adhesiveness. The results are shown in Table 1.

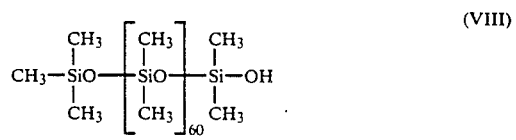
(VIII)

EXAMPLE 2

According to the ratio as shown in Table 1, a dimethylvinylpolysiloxane having a dimethylvinylsilyl terminal group at each end of the molecule, containing 1.0 mole % of vinyl groups, and having a viscosity of 1000 cP was mixed with (i) a methylhydrogenpolysiloxane having a trimethylsilyl terminal group at each end of the molecule, containing 90 mole % of a unit represented by the foregoing formula (V), and having a viscosity of 100 cP, (ii) a methylhydrogenpolysiloxane of general formula (IX) having a Si—H terminal bond at one end, and (iii) 3-methyl-1-butyne-3-ol. After mixing evenly, the mixture was blended with a complex salt prepared from platinum and vinylsiloxane, whereby the composition of Example 2 was obtained.

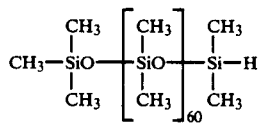

In the same manner as with Example 1, curability, peeling strength of cured film, and rate of residual adhesiveness of the resultant composition were measured. The results are given in Table 1.

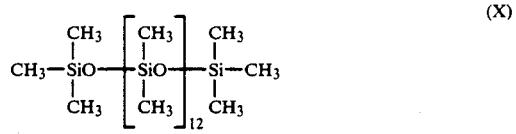

As the results in Table 1 show, the compositions according to the present invention excel the comparative compositions in all of the items of comparison, namely curability, slip factor, rate of residual adhesiveness, peeling strength (hence releaseability), and durability in the air. It is specially noted that even though the adhesive material used in the tests was acrylic the increase in peeling strength due to aging is less progressive in the case of the compositions of the present invention and, therefore, their releaseability after long term storage is dependable. Also, the fact that the slip factor of the composition was improved indicates that the problems experienced in the manufacturing line for applying silicone composition to the base sheet due to stagnation of the flow of the sheet were virtually solved.

TABLE 1

|  |  | Examples | | Comparative Examples | | | | |
|---|---|---|---|---|---|---|---|---|
|  |  | 1 | 2 | 1 | 2 | 3 | 4 | 5 |
| weight | dimethylvinylpolysiloxane | 100 | 100 | 100 | 100 | 100 | 100 | 100 |
| ratio | toluene | 2000 | — | 2000 | 2000 | 2000 | — | — |
| of | methylhydrogenpolysiloxane | 1.0 | 4.0 | 1.0 | 1.0 | 1.0 | 4.0 | 4.0 |
| ingredients | methylhydrogenpolysiloxane having Si - H terminal group at one end | 10.0 (VI) | 6.0 (IX) | — | 10.0 (vii) | 10.0 (VIII) | — | 6.0 (X) |
|  | platinum (ppm) in complex salt of platinum and vinylsiloxane | 150 | 150 | 150 | 150 | 150 | 150 | 150 |
|  | 3-methyl-1-butyne-3-ol | 2.0 | 1.0 | 2.0 | 2.0 | 2.0 | 1.0 | 1.0 |
| properties | curability | A | A | A | B | C | A | B |
| of | slip factor | 0.25 | 0.38 | 0.40 | 0.30 | 0.37 | 0.45 | 0.38 |
| cured | rate of residual adhesiveness (%) | 98 | 98 | 98 | 89 | 85 | 98 | 90 |
| coating | peeling after 1 day aging (g/5 cm) | 43 | 33 | 59 | 55 | 63 | 40 | 38 |
| film | strength after 3 day aging (g/5 cm) | 51 | 36 | 78 | 64 | 85 | 55 | 49 |
|  | after 7 day aging (g/5 cm) | 56 | 40 | 94 | 80 | 103 | 72 | 63 |
|  | after 30 day aging (g/5 cm) | 56 | 41 | 110 | 93 | 108 | 94 | 87 |
|  | durability in the air (g/5 cm) | 80 | 58 | 430 | 140 | 560 | 165 | 130 |

COMPARATIVE EXAMPLE 4

A composition was prepared in the same manner as the preparation of Example 2 except that the methylhydrogenpolysiloxane having a Si—H terminal bond at one end (IX) was omitted. In the same manner as with Example 1, curability, peeling strength of cured film, and rate of residual adhesiveness of the resultant composition were measured. The results are given in Table 1.

COMPARATIVE EXAMPLE 5

A composition was prepared in the same manner as the preparation of Example 2 except that the methylhydrogenpolysiloxane having a Si—H terminal bond at one end (IX) was replaced by a methylpolysiloxane represented by formula (X). The resulting composition was measured in terms of curability, peeling strength of the cured film, and the rate of residual adhesiveness. The results are shown in Table 1.

What is claimed is:

1. In an organopolysiloxane composition which in the presence of a platinum-containing curing catalyst is curable to a release agent for rendering surfaces nonadherent, the improvement wherein said organopolysiloxane comprises a first organopolysiloxane containing at least two silicon-bonded unsaturated groups per molecule, a second organopolysiloxane containing at least two silicon-bonded atoms per molecule, and a third organopolysiloxane containing a single Si—H bond positioned at one end of the molecule.

2. A releasing agent silicone composition according to claim 1, which is rendered curable by the presence therein of a platinum-containing catalyst.

3. A releasing agent silicone composition according to claim 2, wherein said third organopolysiloxane is represented by the following formula:

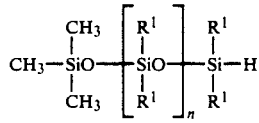

wherein $R^1$ is a monovalent organic group free from aliphatic unsaturation and n is an integer from 1 to 100.

4. A releasing agent silicone composition according to claim 2, which comprises, per 100 weight parts of said first organopolysiloxane, 0.1 to 10 weight parts of said second organopolysiloxane, 0.1 to 50 weight parts of said third organopolysiloxane, and 0.0001 to 0.1 weight part of a platinum-containing curing catalyst.

5. A releasing agent silicone composition according to claim 2, wherein said first organopolysiloxane has a skeletal chain comprising at least one unit of a segment of the formula, $R^5{}_aR^6{}_bSiO_{(4-a-b)/2}$ wherein $R^5$ is an unsaturated hydrocarbon group and $R^6$ is a group having 1 to 8 carbon atoms, and a and b are integers such that $1 \leq a \leq 3$, $0 \leq b \leq 2$, and $1 \leq a+b \leq 3$.

6. A releasing agent silicone composition according to claim 2, wherein said first organopolysiloxane is linear with organic groups bonded thereto, of which more than 90% are methyl.

7. A releasing agent silicone composition according to claim 2, wherein said first organopolysiloxane is vinylsilyl-terminated, and said second organopolysiloxane is linear.

8. A releasing agent silicone composition according to claim 2, wherein the viscosity of said first organopolysiloxane is higher than 100 cP at 25° C.

9. A releasing agent silicone composition according to claim 4, wherein said second organopolysiloxane is a compound of the formula $R^9{}_cH_dSiO_{(4-c-d)/2}$ where $R^9$ is hydrocarbon group of which more than 50% is methyl, and c and d are numbers such that $1 \leq c \leq 2$, $0 < d \leq 1$, and $1.98 \leq c+d \leq 2.02$.

10. A releasing agent silicone composition according to claim 6, wherein the viscosity of said second organopolysiloxane is 10 to 300 cP at 25° C.

11. A releasing agent silicone composition according to claim 3, wherein n is 5 to 80.

12. A releasing agent silicone composition according to claim 4, wherein the mole ratio of the total of the silicon-bonded hydrogen atoms in said second and said third organopolysiloxanes to the silicon-bonded unsaturated groups of said first organopolysiloxane is 0.5 to 5.0.

13. A releasing agent silicone composition according to claim 3, wherein said first organopolysiloxane is linear with organic groups bonded thereto, of which more than 90% are methyl, and wherein the viscosity of said second organopolysiloxane is 10 to 300 cP at 25° C.

14. A releasing agent silicone composition according to claim 13, wherein said second organopolysiloxane is a compound of the formula $R^9{}_cH_dSiO_{(4-c-d)/2}$ where $R^9$ is hydrocarbon group of which more than 50% is methyl, and c and d are numbers such that $1 \leq c \leq 2$, $0 < d \leq 1$, and $1.98 \leq c+d \leq 2.02$, and wherein n is 5 to 80.

15. A release agent coating composition according to claim 14, which comprises, per 100 weight parts of said first organopolysiloxane, 0.1 to 10 weight parts of said second organopolysiloxane, 0.1 to 50 weight parts of said third organopolysiloxane, and 0.0001 to 0.1 weight part of a platinum-containing curing catalyst.

16. A releasing agent silicone composition according to claim 1 which is rendered curable by the presence therein of a curing catalyst.

* * * * *

UNITED STATES PATENT AND TRADEMARK OFFICE
CERTIFICATE OF CORRECTION

PATENT NO. : 4,983,701

DATED : January 8, 1991

INVENTOR(S) : Hara et al

It is certified that error appears in the above-identified patent and that said Letters Patent is hereby corrected as shown below:

Column 10, Claim 1, Line 53:

Reads: "two silicon-bonded atoms per molecule, and a third"

Should Read: --two silicon-bonded hydrogen atoms per molecule, and a third--

Signed and Sealed this

Nineteenth Day of May, 1992

Attest:

DOUGLAS B. COMER

Attesting Officer

Acting Commissioner of Patents and Trademarks